US012709985B2

(12) United States Patent
Chin et al.

(10) Patent No.: US 12,709,985 B2
(45) Date of Patent: Aug. 18, 2026

(54) MULTI-PIECE MANDREL FOR BUILDING UP AIRFOIL STRUCTURE

(71) Applicant: RTX Corporation, Farmington, CT (US)

(72) Inventors: Jonathan L. Chin, Morrisville, NC (US); Alyson T. Burdette, Gilbertsville, PA (US); Jon Erik Sobanski, Glastonbury, CT (US); Rutva A Patel, Middletown, CT (US); Thiago B. Vieira, Sarasota, FL (US); Andrew S. Miller, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 107 days.

(21) Appl. No.: 18/442,913

(22) Filed: Feb. 15, 2024

(65) Prior Publication Data

US 2025/0264027 A1 Aug. 21, 2025

(51) Int. Cl.

| | |
|---|---|
| ***B28B 7/28*** | (2006.01) |
| ***C04B 35/111*** | (2006.01) |
| ***C04B 35/80*** | (2006.01) |
| ***F01D 5/28*** | (2006.01) |

(52) U.S. Cl.

CPC ................ *F01D 5/282* (2013.01); *B28B 7/28* (2013.01); *C04B 35/111* (2013.01); *C04B 35/80* (2013.01)

(58) Field of Classification Search

CPC .. B28B 7/28; B28B 7/30; B28B 7/303; C04B 2235/6028; B29C 70/86; B29C 33/485

See application file for complete search history.

(56) References Cited

U.S. PATENT DOCUMENTS

| | | | | |
|---|---|---|---|---|
| 4,310,138 | A * | 1/1982 | Johnston | B29C 33/485 249/178 |
| 7,638,084 | B2 * | 12/2009 | Frankel | B29C 70/446 264/512 |
| 9,144,949 | B2 | 9/2015 | Ender | |
| 11,097,450 | B2 | 8/2021 | Eisch et al. | |
| 11,396,814 | B2 | 7/2022 | Barker | |
| 11,400,624 | B2 | 8/2022 | Blaney et al. | |
| 11,549,378 | B1 * | 1/2023 | Sobanski | F01D 9/041 |

(Continued)

FOREIGN PATENT DOCUMENTS

| | | | |
|---|---|---|---|
| DE | 3837571 A1 | 5/1990 | |
| EP | 4385717 A1 * | 6/2024 | B29C 33/04 |

(Continued)

OTHER PUBLICATIONS

European Search Report for EP Application No. 25157819.1 dated Jul. 14, 2025.

*Primary Examiner* — Erin Snelting

(74) *Attorney, Agent, or Firm* — Carlson, Gaskey & Olds, P.C.

(57) ABSTRACT

A mandrel includes a mandrel body upon which to build ceramic matrix composite ("CMC") yarns to provide a shear tube for building up an airfoil from CMC fabric layers. The mandrel body formed of at least two mandrel parts interfitting to define a desired shape for the shear tube, and such that after formation of the airfoil the at least two parts of the mandrel body can be separately removed from the shear tube in order to facilitate removal. A method is also disclosed.

8 Claims, 6 Drawing Sheets

(56) References Cited

U.S. PATENT DOCUMENTS

2008/0115887 A1* 5/2008 Kaye ..................... B29C 70/545
156/307.1
2008/0302486 A1* 12/2008 Jones ...................... B29C 33/76
156/475
2009/0014926 A1 1/2009 Marini
2009/0189325 A1* 7/2009 Callis ...................... B29C 70/32
29/889.71
2010/0230850 A1 9/2010 Sanderson
2011/0274553 A1* 11/2011 Stiesdal .................. B29C 70/48
156/196
2013/0075025 A1* 3/2013 Guitton ................... B29C 70/68
156/245
2013/0181374 A1* 7/2013 Ender ..................... B29C 33/44
264/258
2019/0210929 A1* 7/2019 Propheter-Hinckley .....................
C04B 35/62218
2019/0283271 A1 9/2019 Tsuru et al.
2020/0094444 A1* 3/2020 Chuck ................. B29C 33/0033
2020/0094447 A1* 3/2020 Blaney ............... B29D 99/0053
2021/0163365 A1 6/2021 Propheter-Hinckley
2021/0381384 A1* 12/2021 Barker .................... F01D 5/147
2022/0017215 A1* 1/2022 Dunn .................... B29C 33/485
2023/0033860 A1* 2/2023 Kobierecki ........... B29C 70/446
2023/0219316 A1* 7/2023 Biegel ................... F03D 1/0675
416/230
2024/0391199 A1* 11/2024 Pujari ................ B29D 99/0028

FOREIGN PATENT DOCUMENTS

ES 2947934 T3 * 8/2023 ............. B64C 1/065
GB 568820 A * 4/1945 ............... B28B 7/30

* cited by examiner 106
124
128
201
135
126
118
219
134
114
136
108
200

X
Y 106
124
128
126
136
135
124
118
219
134
114
108

106
124
128
135
118
219
134
114
108

MULTI-PIECE MANDREL FOR BUILDING UP AIRFOIL STRUCTURE

BACKGROUND

This application relates to a mandrel for forming a shear tube to use as a base for building an airfoil structure. A method is also disclosed.

Gas turbine engines are known, and typically include a propulsor delivering air as propulsion air. The air is also delivered into a compressor. Compressed air is then delivered into a combustor where it is mixed with fuel and ignited. Products of this combustion pass downstream over turbine rotors, driving them to rotate.

It is known that the products of combustion are quite hot. As such, it has been proposed to form turbine components from ceramic matrix composites ("CMCs"). In one method of forming ceramic matrix composite airfoils, a mandrel is provided to make a base for a braided tube formed of CMC yarns known as a shear tube. Fabric layers may then be placed outwardly of the shear tube to form a component having an airfoil. The component is then densified.

After densification the mandrel must be removed from the shear tube. There are some airfoil designs which would raise challenges with removal of the mandrel.

SUMMARY

In a featured embodiment, a mandrel includes a mandrel body upon which to build ceramic matrix composite ("CMC") yarns to provide a shear tube for building up an airfoil from CMC fabric layers. The mandrel body formed of at least two mandrel parts interfitting to define a desired shape for the shear tube, and such that after formation of the airfoil the at least two parts of the mandrel body can be separately removed from the shear tube in order to facilitate removal.

In another embodiment according to the previous embodiment, a first of the two mandrel parts has a bowed profile such that a central portion is spaced closer to a second of the two mandrel parts then are upper and lower areas of the first mandrel part, and the second mandrel part has an outer shape which is closer to straight, such that the second mandrel part can be initially removed from the shear tube. The first mandrel part can be moved away from a bowed surface on an inner periphery of the shear tube such that the first mandrel part can then be removed.

In another embodiment according to any of the previous embodiments, the mandrel body has grooves on an outer surface to facilitate the movement of gas during a densification process of the CMC yarns and fabric layers.

In another embodiment according to any of the previous embodiments, the mandrel shape further has a twist along a radial length of the at least two mandrel parts.

In another embodiment according to any of the previous embodiments, the interfitting of the at least two mandrel parts is provided by a tongue and groove connection between the first and second mandrel parts.

In another embodiment according to any of the previous embodiments, edges of each of the first and second mandrel parts are formed with chamfers to allow turning of one of the first and second mandrel parts relative to the other to facilitate removal of the one of the first and second mandrel parts.

In another embodiment according to any of the previous embodiments, the mandrel shape further has a twist along a radial length of the at least two mandrel parts.

In another embodiment according to any of the previous embodiments, edges of each of the two mandrel parts are formed with chamfers to allow turning of one of the two mandrel parts relative to the other to facilitate removal of the one of the first and second mandrel parts.

In another featured embodiment, a method of forming a gas turbine engine component having a airfoil includes the steps of providing a mandrel formed of at least two mandrel parts. A shear tube is formed on an outer surface of the at least two parts of the mandrel by placing a ceramic matrix composites ("CMC") yarn on an outer surface of the at least two mandrel parts. Additional CMC fabric layers are formed on the shear tube to form the airfoil. The CMC fabric layers and yarn then begin to be densified. One of the two mandrel parts is removed. Then the other of the two mandrel parts is removed.

In another embodiment according to any of the previous embodiments, a first of the two mandrel parts has a bowed profile such that a central portion is spaced closer to a second of the two mandrel parts then are upper and lower areas of the first mandrel part, and the second mandrel part has an outer shape which is closer to straight, and the second mandrel part being the one initially removed from the shear tube. The first mandrel part is then moved away from a bowed surface on an inner periphery of the shear tube, and the first mandrel part then is the other removed part.

In another embodiment according to any of the previous embodiments, the mandrel body has grooves on an outer surface to facilitate movement of gas during the densification step of the CMC yarns and fabric layers.

In another embodiment according to any of the previous embodiments, the mandrel shape further has a twist along a radial length of the at least two mandrel parts.

In another embodiment according to any of the previous embodiments, the first and second mandrel parts have a tongue and groove connection.

In another embodiment according to any of the previous embodiments, edges of each of the first and second mandrel parts are formed with chamfers to allow turning of one of the two mandrel parts relative to the other to facilitate removal of the second mandrel part.

In another embodiment according to any of the previous embodiments, the mandrel body has grooves on an outer surface to facilitate movement of gas during the densification step of the CMC yarns and fabric layers.

In another embodiment according to any of the previous embodiments, the mandrel shape further has a twist along a radial length of the at least two mandrel parts.

In another embodiment according to any of the previous embodiments, the at least two mandrel parts have a tongue and groove connection.

In another embodiment according to any of the previous embodiments, edges of each of the two mandrel parts are formed with chamfers to allow turning of one of the at least two mandrel parts relative to the other to facilitate removal of the one of the two mandrel parts.

In another embodiment according to any of the previous embodiments, the at least two mandrel parts have a tongue and groove connection.

In another embodiment according to any of the previous embodiments, edges of each of the at least two mandrel parts formed with chamfers to allow turning of one of the at least two mandrel parts relative to the other to facilitate removal of the one of the two mandrel parts.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
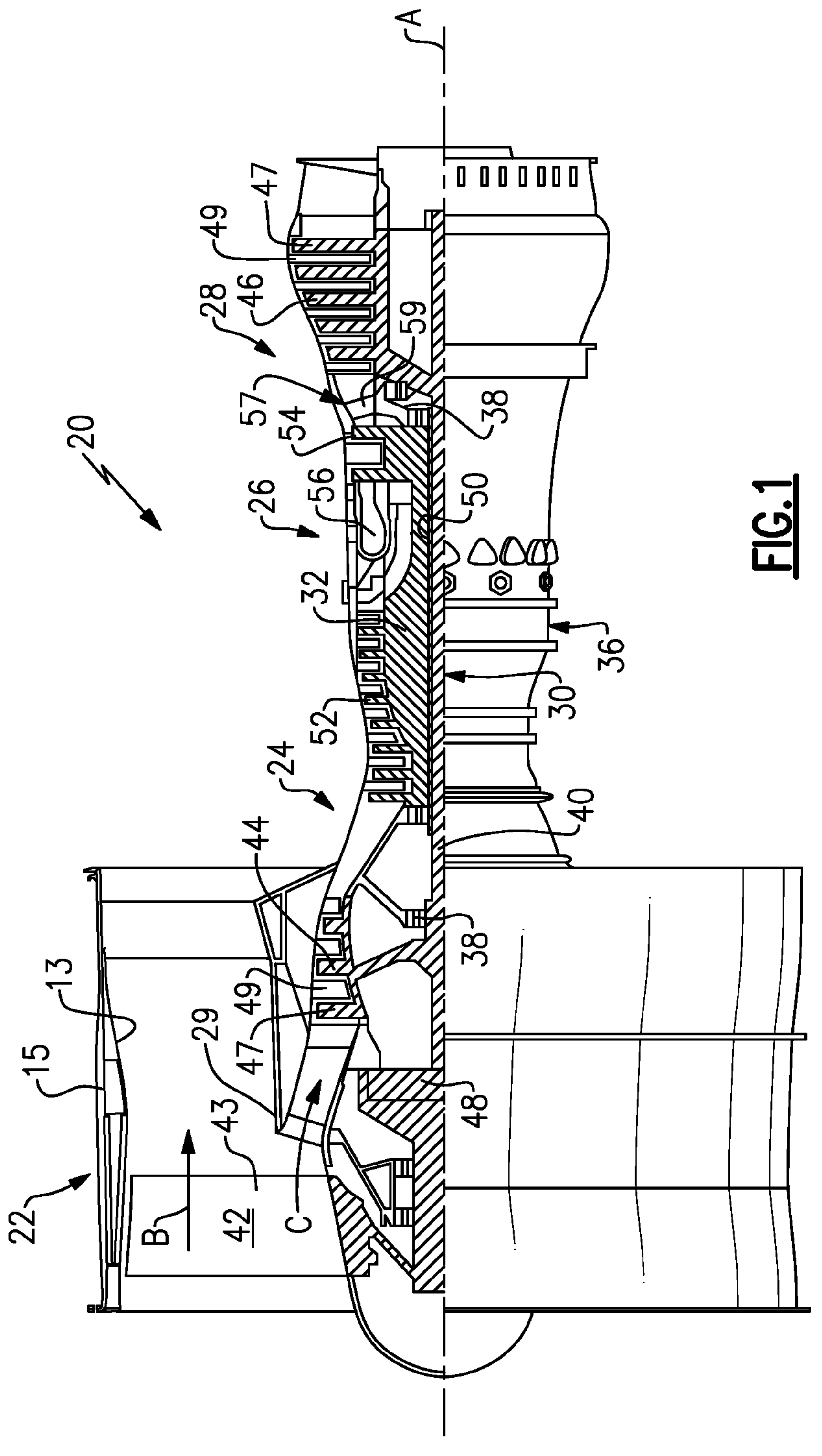
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } ° \text{R})/(518.7° \text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
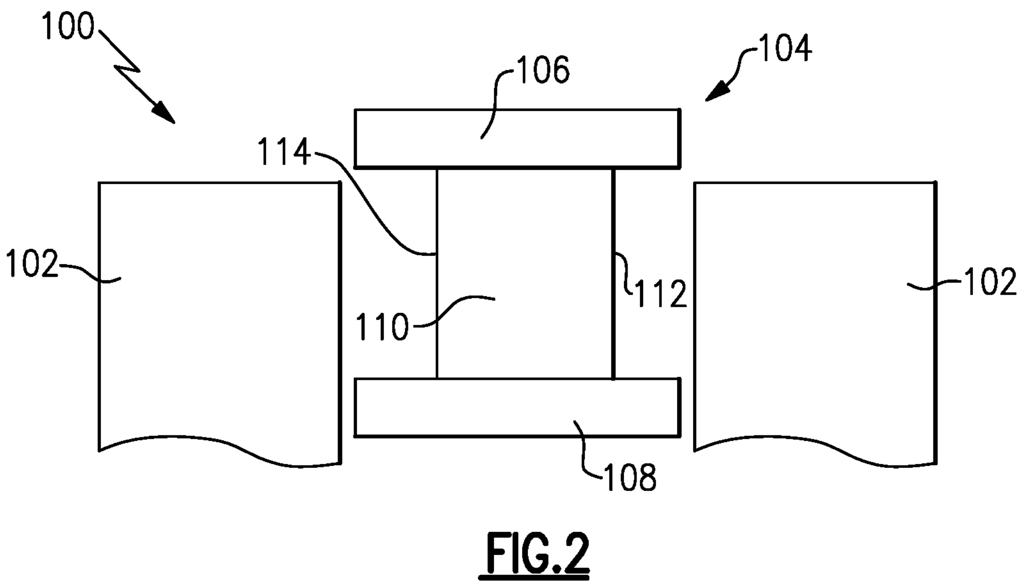
FIG. 2 schematically shows a turbine section.

FIG. 2 schematically shows a turbine section 100 having a pair of spaced rotating turbine blades 102. An intermediate static vane 104 is shown having an outer platform 106, an inner platform 108 and an intermediate airfoil 110. As known, the airfoil 110 extends between a leading edge 114 and a trailing edge 112.

Figure 3A:
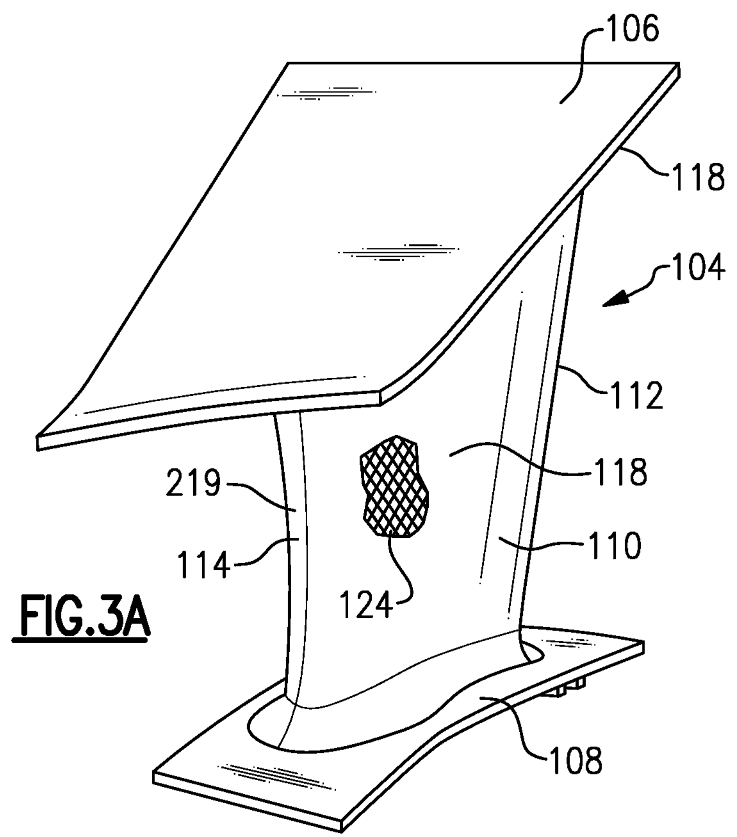
FIG. 3A shows a vane which may be utilized in the turbine section of FIG. 2.

FIG. 3A is a view of the vane 104. There is a pressure side and a suction side. The airfoil 110 merges into both of the platforms 106 and 108 along each of the pressure side and the suction side and around the leading edge 114 and the trailing edge 112. As shown a radially central portion 219 is bowed relative to radially inner and outer areas at the leading edge 114.

The vane 104 is formed of layers of ceramic matrix composite fabric plies.

A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

This disclosure relates to a method of forming a vane such as vane 104.

Figure 3B:
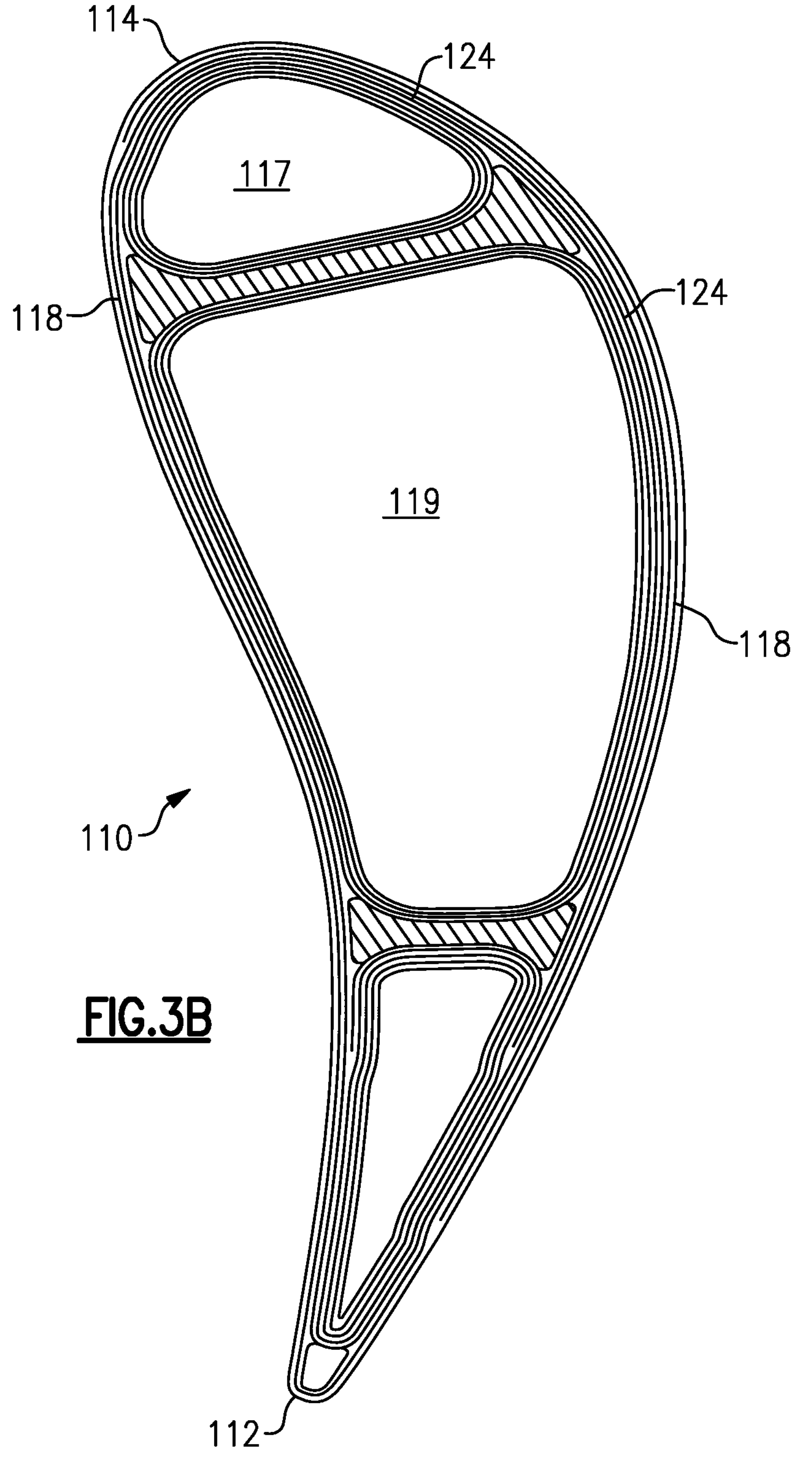
FIG. 3B is a cross-section through the FIG. 3A vane.

FIG. 3B shows the airfoil 110. The airfoil has a shear tube 124 received in a hollow chamber 117 adjacent leading edge 114. Another shear tube 124 is in a chamber 119 spaced further from the leading edge 114 than the chamber 117. Outer fabric layers 118 are positioned outwardly of the shear tubes 124.

Figure 4:
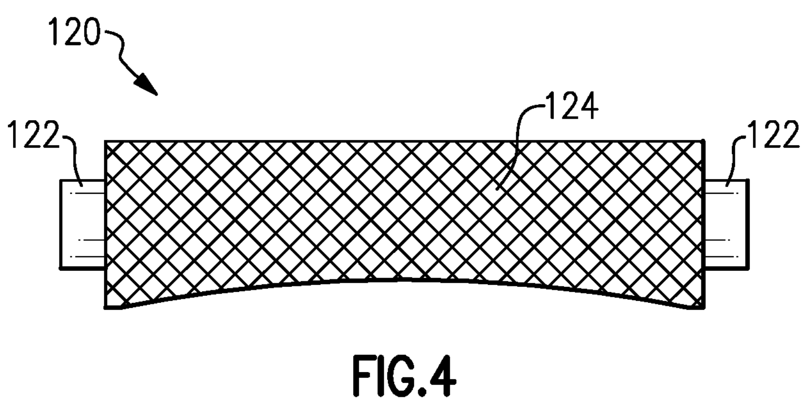
FIG. 4 shows a mandrel and shear tube.

As shown in FIG. 4 at 120, a mandrel 122 may be formed of graphite, and provides a shape upon which to form a shear tube 124. The shear tube 124 may be formed of braided CMC yarn.

Figure 5A:
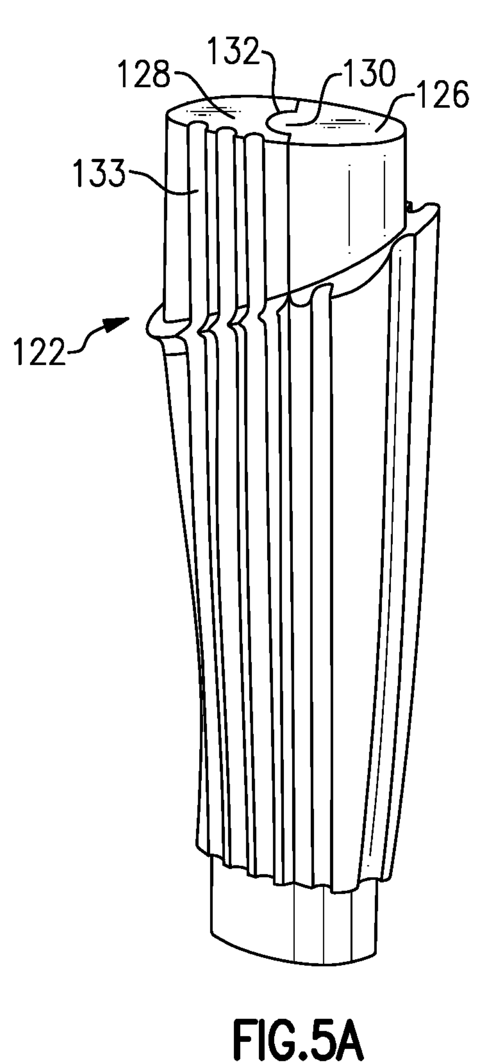
FIG. 5A is a perspective view of a mandrel.

As shown in FIG. 5A, the mandrel 122 is formed of two parts 126 and 128. The part 126 has a groove 132 and the part 128 has a tongue 130. Of course, any number of other interfitting structure may be utilized. Grooves 133 are formed on an outer surface to facilitate densification.

Figure 5B:
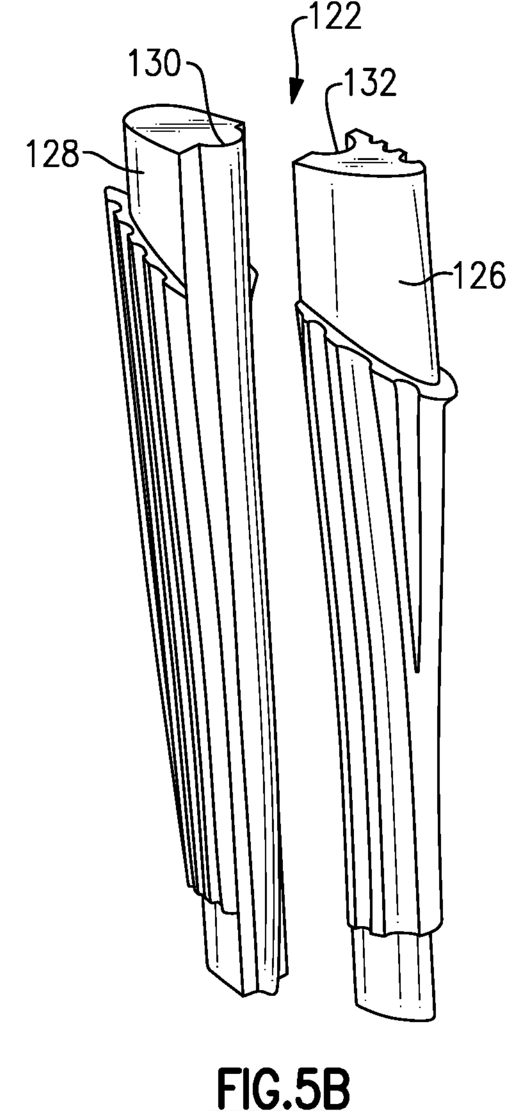
FIG. 5B shows a two part mandrel separated.

As shown in FIG. 5B, the parts 126 and 128 can be separated, as they are connected together to form the shear tube.

Figures 6A, 6B, 6C, 6D:
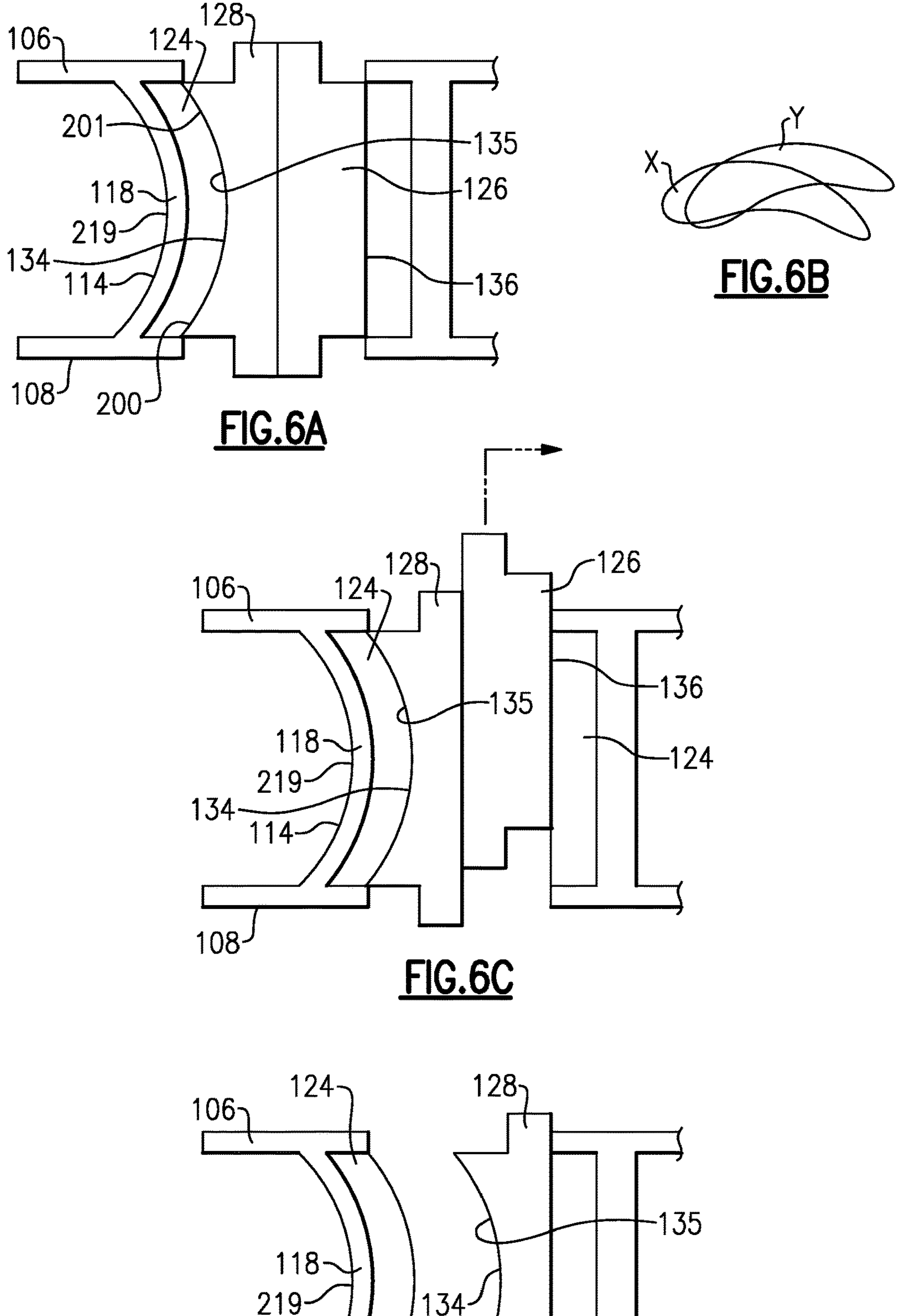
FIG. 6A shows a first step in removing the FIG. 5A/B mandrel.
FIG. 6B shows a feature of the airfoil.
FIG. 6C is a step subsequent to FIG. 6A.
FIG. 6D shows a step subsequent to the FIG. 6C step.

As shown in FIG. 6A, the mandrel 120 with parts 126 and 128 is used as a base to form the shear tube 124 with a braided machine. Then, outer structure is formed from fabric layers 118 to form the airfoil. The inner and outer platforms 106/108 are also attached of the vane 104.

As shown in this Figure, one face 134 of the mandrel, and thus the shear tube 124 has a distinctive curve, bend or bow such that upper 201 and lower ends 200 are spaced further away from a central portion 135 to form central bow 219. On the other hand, outer face 136 of the half 126 is closer to straight.

It could be said a first of the two mandrel parts 128 has a bowed profile such that a central portion 135 is spaced closer to a second of the mandrel parts 126 then are upper 201 and lower ends 200 of the first mandrel part 128. The second mandrel part 126 has an outer shape 136 which is closer to straight, such that the second mandrel part 136 can be initially removed from the shear tube, and the first mandrel part 128 can then be moved away from a bowed surface on an inner periphery of the shear tube 128 such that the first mandrel part can be removed.

After the formation of the fabric layers 118 on the shear tube 124, the vane 104 is densified, as known. The grooves 133 facilitate the movement of the densification gasses into an inner surface of the shear tube 124. The mandrel 122 must then be removed. As can be appreciated, the central portion 135 would raise a challenge with removing the combined mandrel 126/128 upwardly or radially outwardly as shown in this FIG. 6A.

In fact, in some embodiments the densification may be a multi-step process. As an example, there may be an initial run which applies an interface coating on the fiber to partially densify the matrix. The mandrel may then be removed, and further densification steps may be performed.

FIG. 6B shows that the airfoil outer periphery changes its orientation with a twist in a radial distance such as shown at X and Y. This further complicates removal of the mandrel 122.

However, due to the two part mandrel 122, as shown in FIG. 6C, the mandrel half 126 with the flatter outer face 136 can be simply removed upwardly and out of the shear tube 124.

Now, as show in FIG. 6D, the mandrel half 128 can be moved to the right in this figure and then can then be easily removed. Due to the extra space from the removal of the mandrel half 136 the shape of face 134 does not provide any challenge to the removal.

Figure 7A:
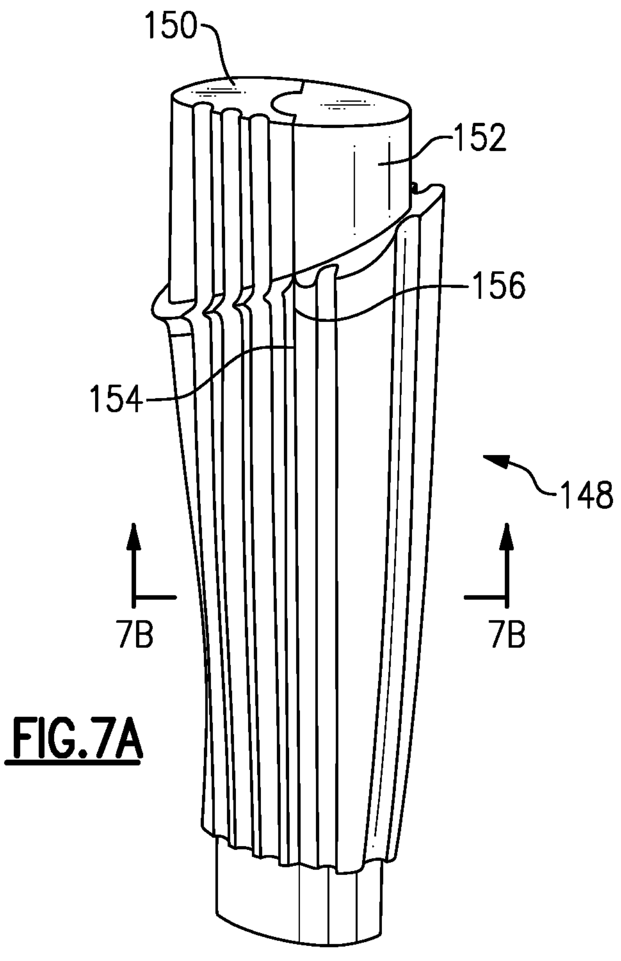
FIG. 7A shows another embodiment mandrel.

As shown in FIG. 7A, another embodiment mandrel 148 also has two parts 150 and 152. However, edges of the two parts 150 and 152 are formed as chamfered surfaces 154 and 156.

Figure 7B:
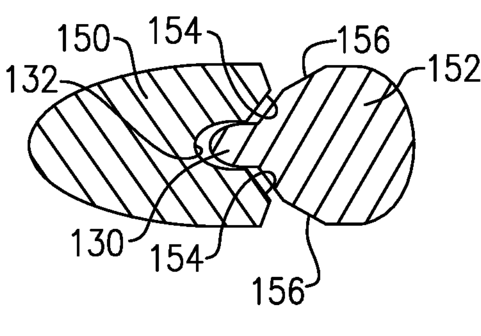
FIG. 7B shows a step in removing the FIG. 7A mandrel which may be in addition to the steps of FIGS. 6A-6C.

Now, as shown in FIG. 7B, when removing the mandrel part 152 it can be rocked on the tongue and groove connection 130/132 such that one chamfered surface 156 on part 152 moves into a chamfered surface 154 on the part 150. The other chamfered surface 156 moves away from the other chamfered surface 154 on the part 150. This may facilitate movement of the part 152 outwardly of the shear tube.

Chamfered surfaces 154 and 156 also facilitate the movement of densification gases during densification, similar to grooves 133.

A mandrel under this disclosure could be said to include a mandrel body upon which to build ceramic matrix composite ("CMC") yarns to provide a shear tube for building up an airfoil from CMC fabric layers. The mandrel body is formed of at least two mandrel parts interfitting to define a desired shape for the shear tube, and such that after formation of the airfoil the at least two parts of the mandrel body can be separately removed from the shear tube in order to facilitate removal.

A method of forming a gas turbine engine component having an airfoil under this disclosure could be said to include the steps of providing a mandrel formed of at least two mandrel parts. A shear tube is formed on an outer surface of the at least two parts of the mandrel by placing a ceramic matrix composites ("CMC") yarn on an outer surface of the at least two mandrel parts. Additional CMC fabric layers are formed on the shear tube to form the airfoil. The CMC fabric layers and yarn then begin to be densified. One of the two mandrel parts is removed. Then the other of the two mandrel parts is removed.

Although embodiments of this disclosure have been disclosed, a worker of ordinary skill in this art would recognize that modifications would come within the scope of this disclosure. For that reason, the following claims should be studied to determine the true scope and content of this disclosure.

What is claimed is:

1. A method of forming a gas turbine engine component having a airfoil including the steps of:

providing a mandrel formed of at least two mandrel parts, with interfitting structure to hold the at least two mandrel parts together;

forming a shear tube on an outer surface of the at least two parts of the mandrel by placing a ceramic matrix composite ("CMC") yarn on the outer surface of the at least two mandrel parts;

forming additional CMC fabric layers on the shear tube to form the airfoil;

beginning densifying the CMC fabric layers and yarn;

removing one of the at least two mandrel parts; and then removing an other of the at least two mandrel parts.

2. The method as set forth in claim 1, wherein a first of the at least two mandrel parts has a bowed profile such that a central portion is spaced closer to a second of the at least two mandrel parts than are upper and lower areas of the first mandrel part, and the second mandrel part has an outer shape which is closer to straight, and the second mandrel part being the one initially removed from the shear tube, and the first mandrel part then moved away from a bowed surface on an inner periphery of the shear tube, and the first mandrel part then being the other removed part.

3. The method as set forth in claim 2, wherein the mandrel has grooves on an outer surface to facilitate movement of gas during the densification step of the CMC yarn and fabric layers.

4. The method as set forth in claim 2, wherein the interfitting structure between is that the first and second mandrel parts have a tongue and groove connection.

5. The method as set forth in claim 2, wherein edges of each of the first and second mandrel parts are formed with chamfers to allow turning of the one of the at least two mandrel parts relative to the other to facilitate removal of the second mandrel part.

6. The method as set forth in claim 1, wherein the mandrel has grooves on the outer surface to facilitate movement of gas during the densification step of the CMC yarn and fabric layers.

7. The method as set forth in claim 1, wherein the interfitting structure is that the at least two mandrel parts have a tongue and groove connection.

8. The method as set forth in claim 7, wherein edges of each of the at least two mandrel parts are formed with chamfers to allow turning of the one of the at least two mandrel parts relative to the other to facilitate removal of the one of the at least two mandrel parts.

* * * * *